J. S. ALLEN.
HAT HOLDER.
APPLICATION FILED AUG. 29, 1919.
1,379,605.
Patented May 31, 1921.
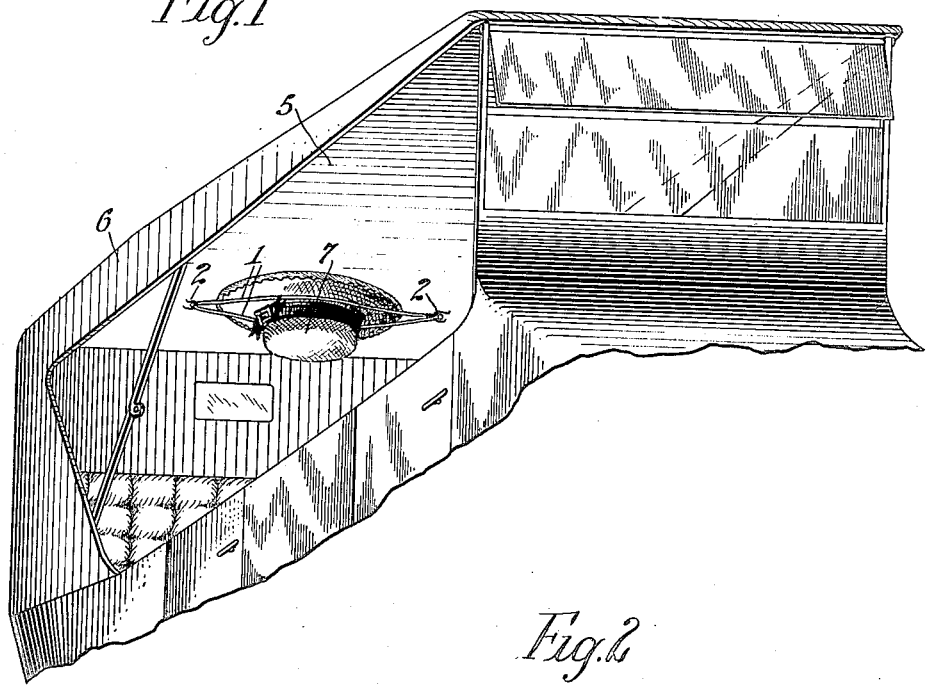
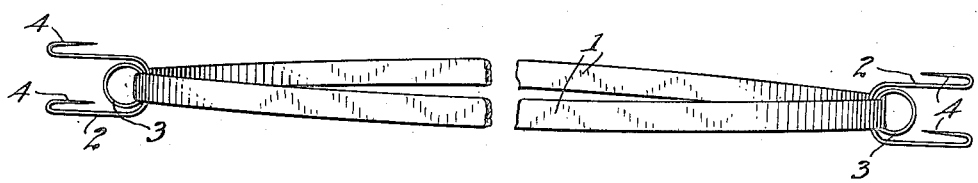
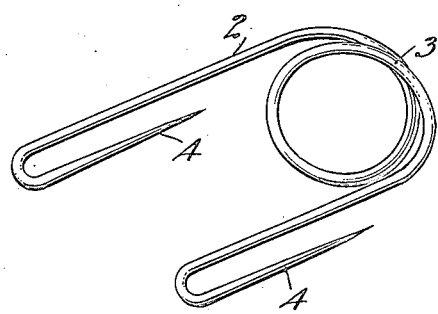
WITNESSES
F. Frederick
S. W. Foster
INVENTOR
Judge S. Allen
BY
ATTORNEYS

UNITED STATES PATENT OFFICE.

JUDGE SHIRLOCK ALLEN, OF NEW YORK, N. Y.

HAT-HOLDER.

1,379,605.　　　　　Specification of Letters Patent.　　Patented May 31, 1921.

Application filed August 29, 1919. Serial No. 320,625.

*To all whom it may concern:*

Be it known that I, JUDGE S. ALLEN, a citizen of the United States, and a resident of the city of New York, borough of Manhattan, in the county of New York and State of New York, have invented a new and Improved Hat-Holder, of which the following is a full, clear, and exact description.

This invention relates to improvements in hat holders, an object of the invention being to provide a device of the character stated which is designed to support a hat in the top of an automobile and the like, and which can be easily and quickly placed in operative position or removed therefrom.

A further object is to provide a device of the character stated, which can be manufactured and sold at an extremely low price and which will most efficiently perform the functions for which it is intended.

With these and other objects in view, the invention consists in certain novel features of construction and combinations and arrangements of parts as will be more fully hereinafter described and pointed out in the claim.

In the accompanying drawings:—

Figure 1 is a fragmentary perspective view showing my improved device in position in an automobile.

Fig. 2 is an enlarged broken view of the device detached.

Fig. 3 is a perspective view of one of the supporting hooks.

1 represents a strip of elastic having its ends joined so that the strip is for all practical purposes endless.

2, 2, are hooks which are composed of wire having coiled intermediate portions forming eyes 3 and sharp hook shaped ends 4.

The strip 1 is passed through the eyes 3 and when the device is in use, the hooks 2, 2, support the strip at a slight tension.

The hooks 2, 2, may be secured in the lining 5 of an automobile top 6 or may be attached to any other part that will hold them.

The hat 7 is positioned with the crown between the two runs of strip 1 and in an inverted position, as shown in Fig. 1, so that the strip not only clamps the crown but presses the rim of the hat upwardly to securely hold the same, yet permit its ready removal when desired.

Various slight changes might be made in the general form of the parts described without departing from my invention, and hence I do not limit myself to the precise details set forth but consider myself at liberty to make such slight changes and alterations as fairly fall within the spirit and scope of the appended claim.

I claim:—

A hat holder, comprising a pair of hooks adapted to be positioned in the under face of an automobile top, and an endless elastic device stretched between the hooks, the two runs of said elastic device adapted to be forcibly spread apart to receive the crown of a hat therebetween when the brim of the hat is located against the automobile top.

JUDGE SHIRLOCK ALLEN.